May 18, 1926.
R. HALE
JOINT FASTENER
Filed July 6, 1925
1,584,926
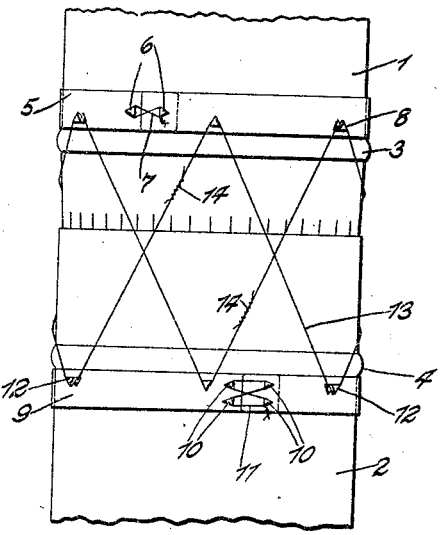
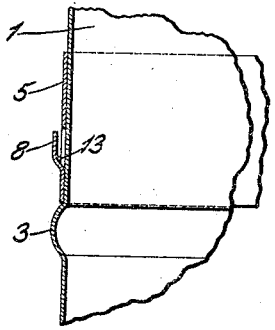
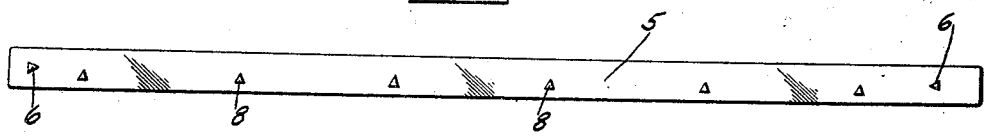
INVENTOR.
REID HALE,
By
His ATTORNEYS.

Patented May 18, 1926.

1,584,926

UNITED STATES PATENT OFFICE.

REID HALE, OF BRENTWOOD, MISSOURI.

JOINT FASTENER.

Application filed July 6, 1925. Serial No. 41,601.

This invention relates to joint fasteners.

An object of the invention is to provide an improved fastener for jointed members such as pipes, tubes, or other sectional elements, which fastener includes a lacing arranged in such relationship across the joint that the parts are thereby held firmly in proper relationship to each other.

Another object of the invention is to provide a joint fastener including bands secured around the jointed members adjacent to their contacting ends, and a lacing of wire or other appropriate material having connection with the bands whereby the jointed members are firmly held together.

Another object of the invention is to provide a joint fastener comprising a pair of bands adapted and designed to be placed around jointed members of different diameters, and means for holding the bands in clamping engagement with the jointed members, in combination with a lacing element connecting the bands together and holding the jointed members in proper relationship.

Other objects will appear from the following description, reference being made to the accompanying drawing, in which Fig. 1 is a view showing my invention in use.

Fig. 2 is an enlarged sectional view showing one of the extensible and contractible bands upon a joint member.

Fig. 3 is a view showing one of the bands extended.

As shown in Fig. 1 the invention is applied to the joint of pipe or tube sections 1 and 2, though it will be understood that the utility of the invention is not restricted to pipes or tubes, but that it may be used in connection with a number of different kinds of joint members. As shown, the end of the section 1 telescopes within the end of the section 2 and is provided with a circumferential bead 3 while the section 2 is formed with a circumferential bead 4. A band 5 is placed around the section 1 above the bead 3, the end portions of said band being formed with stamped out hooks 6 extending oppositely. A piece of wire 7, or other appropriate lacing material, is engaged under the hooks 6 and has its ends twisted or otherwise secured together to clamp the band upon the joint member 1. The use of the lacing member 7 renders the band 5 extensible and contractible so that it may be applied to jointed members of varying diameters. The band 5 is also formed with a number of stamped out hooks or ears 8 extending in a direction away from the bead 3.

A band 9 is formed with a number of stamped out hooks or projections 10 near its ends and is placed around the joint member 2 adjacent to the bead 4 and secured thereon by a lacing member 11 engaging the hooks or projections 10. A number of hooks or ears 12 are stamped from the band 9 extending oppositely from the bead 4.

A lacing 13 of wire or other appropriate lacing material is laced upon the hooks or projections 8 and 12 and is drawn tight to draw the jointed members toward each other and to hold them in proper relationship and prevent their separation. The ends of the laces 13 are twisted or fastened together at 14 so that when once assembled the joint fastener will remain indefinitely.

From the foregoing it will be seen that my improved joint fastener is capable of use for a wide variety of purposes. It is specially adapted for use in holding stove pipes and other pipes or tube sections together but, obviously, may be used for other purposes. I am aware that the specific construction and arrangement of the parts may be varied without departure from the nature and principle of the invention, and therefore do not restrict myself unessentially.

What I claim and desire to secure by Letters Patent is:—

1. A joint fastener comprising a pair of bands, means wholly supported by said bands for securing the bands around the adjacent ends of jointed members, and a lacing element having numerous connections with each of said bands and winding around the jointed members.

2. A joint fastener comprising a pair of bands arranged to encircle jointed members, means wholly supported by said bands for securing the bands around jointed members of different sizes, and laces connecting the bands in numerous places and securing the jointed members together.

REID HALE.